(12) United States Patent
Kuo (10) Patent No.: US 9,412,250 B2
(45) Date of Patent: Aug. 9, 2016

(54) ALERT METHOD AND ALERT SYSTEM THEREOF (71) Applicant: Nuvoton Technology Corporation, Hsinchu (TW)

(72) Inventor: Tzu-Jen Kuo, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 252 days.

(21) Appl. No.: 14/185,377

(22) Filed: Feb. 20, 2014

(65) Prior Publication Data

US 2015/0042478 A1  Feb. 12, 2015

(30) Foreign Application Priority Data

Aug. 6, 2013 (TW) .............................. 102128054 A (51) Int. Cl.
*G08B 23/00* (2006.01)
*G08B 21/02* (2006.01)
*B60K 28/06* (2006.01)
*B60W 40/08* (2012.01)
*G08B 21/06* (2006.01)

(52) U.S. Cl.
CPC ................ *G08B 21/02* (2013.01); *B60K 28/06* (2013.01); *B60K 28/066* (2013.01); *B60W 40/08* (2013.01); *G08B 21/06* (2013.01); *B60W 2040/0827* (2013.01); *B60W 2540/18* (2013.01)

(58) Field of Classification Search
CPC ....... G08B 21/06; B60K 28/06; B60K 28/066
USPC .................................... 340/576, 575; 180/272
See application file for complete search history.

(56) References Cited

U.S. PATENT DOCUMENTS

| 4,594,583 | A | * | 6/1986 | Seko et al. | 340/576 |
| 4,604,611 | A | * | 8/1986 | Seko et al. | 340/576 |
| 4,611,199 | A | * | 9/1986 | Seko et al. | 340/576 |
| 5,907,282 | A | * | 5/1999 | Tuorto et al. | 340/576 |
| 6,426,702 | B1 | | 7/2002 | Young et al. | |
| 7,710,279 | B1 | | 5/2010 | Fields | |
| 8,184,856 | B2 | * | 5/2012 | Smith et al. | 340/576 |
| 8,957,779 | B2 | * | 2/2015 | Wu et al. | 340/575 |

(Continued)

FOREIGN PATENT DOCUMENTS

| CN | 203093753 U | 7/2013 |
| JP | 3374613 B2 | 2/2003 |

(Continued)

OTHER PUBLICATIONS

Horng, Wen-Bing et al., "A Real-Time Driver Fatigue Detection System Based on Eye Tracking and Dynamic Template Matching", Tamkang Journal of Science and Engineering, vol. 11, No. 1, pp. 65-72, 2008.

(Continued)

*Primary Examiner* — John A Tweel, Jr.
(74) *Attorney, Agent, or Firm* — Muncy, Geissler, Olds & Low, P.C.

(57) ABSTRACT

An alert method and an alert system thereof. The alert method includes: detecting, by a turn detector installed on a steering wheel, a first turn and a second turn of the steering wheel in a predetermined period; generating, by a controller, a first alert signal based on the first and second turns; and when receiving the first alert signal, generating, by an alert device, a first alert message.

14 Claims, 5 Drawing Sheets

(56) References Cited

U.S. PATENT DOCUMENTS

| | | |
|---|---|---|
| 2008/0074618 A1 | 3/2008 | Qi |
| 2009/0308679 A1 | 12/2009 | Murgu |
| 2010/0102972 A1 | 4/2010 | Middlekauff et al. |
| 2010/0191422 A1 | 7/2010 | Reichert |

FOREIGN PATENT DOCUMENTS

| | | |
|---|---|---|
| TW | I270827 B | 1/2007 |
| TW | M338411 U | 8/2008 |
| WO | WO-2012/112300 A1 | 8/2012 |
| WO | WO-2013/016213 A1 | 1/2013 |

OTHER PUBLICATIONS

Barr, Lawrence et al., "A Review and Evaluation of Emerging Driver Fatigue Detection Measures and Technologies", National Transportation Systems Center, Cambridge. US Department of Transportation, Washington, DC, Disponível em< http://www. ecse. rpi. edu/~qji/Fatigue/fatigue_report_dot. pdf, pp. 1-27, 2005.

Barr, Lawrence et al., "An Evaluation of Emerging Driver Fatigue Detection Measures and Technologies", U.S. Department of Transportation Federal Motor Carrier Safety Administration, No. FMCSA-RRR-09-005, pp. 1-53, Jun. 2009.

Coetzer, Reinier. "Driver fatigue detection based on eye tracking.", Southern Africa Telecommunication Networks and Applications Conference (SATNAC), pp. 1-2, 2010.

King, L. M., et al.,"Early driver fatigue detection from electroencephalography signals using artificial neural networks.", Proceedings of the 28th IEEE, EMBS Annual International Conference, New York, pp. 2187-2190, Aug. 30-Sep. 3, 2006.

Devi, M.S., "Driver Fatigue Detection Based on Eye Tracking.", Emerging Trends in Engineering and Technology, (Abstract Only), 2008, pp. 1-2.

Office Action and Search Report issued in corresponding TW Application 102128054 on Dec. 21, 2015, pp. 1-9.

Huang, Li-Kun, "The Development of Head Control System Based on Ultrasonic," Master's Degree, Feng Chia University, Jul. 3, 2003, pp. 1-6.

Office Action issued in corresponding CN Application 201310467155.1 on Dec. 31, 2015, pp. 1-7.

\* cited by examiner

ALERT METHOD AND ALERT SYSTEM THEREOF

CROSS REFERENCE TO RELATED APPLICATIONS

This Application claims priority of Taiwan Patent Application No. 102128054, filed on Aug. 6, 2013, and the entirety of which is incorporated by reference herein.

BACKGROUND

1. Field

The present disclosure relates to an alert method and alert systems thereof.

2. Description of the Related Art

The rate of car accidents is increasing as the use of motorized vehicles for transportation becomes more common. According to data from the United States Federal Bureau of Investigation, 20 to 30 percent of car accidents are due to driver fatigue and slow response time on the part of drivers.

Due to the development of technology and advances in the motor-vehicle industry, more and more vehicles are adopting electronic technology to detect driver fatigue, thus helping to prevent or reduce car accidents.

BRIEF SUMMARY OF THE DISCLOSURE

A detailed description is given in the following embodiments with reference to the accompanying drawings.

An embodiment of an alert method is disclosed, including: detecting, by a turn detector installed on a steering wheel, a first turn and a second turn of the steering wheel in a predetermined period; generating, by a controller, a first alert signal based on the first and second turns; and when receiving the first alert signal, generating, by an alert device, a first alert message.

Another embodiment of an alert system is provided, including a steering wheel, a turn detector, a controller and an alert device. The turn detector, installed on the steering wheel, is configured to detect a first turn and a second turn of the steering wheel in a predetermined period. The controller, coupled to the turn detector, is configured to generate a first alert signal based on the first and second turns. The alert device, coupled to the controller, when receiving the first alert signal, is configured to generate a first alert message.

Another embodiment of an alert system is provided, including a plurality of ultrasonic transceivers, a controller and an alert device. The plurality of ultrasonic transceivers are configured to detect head-swing information pertaining to the movement of the user's head. The controller, coupled to the plurality of ultrasonic transceivers, is configured to generate a first alert signal based on the head-swing information. The alert device, coupled to the controller, is configured to generate a first alert message when receiving the first alert signal.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
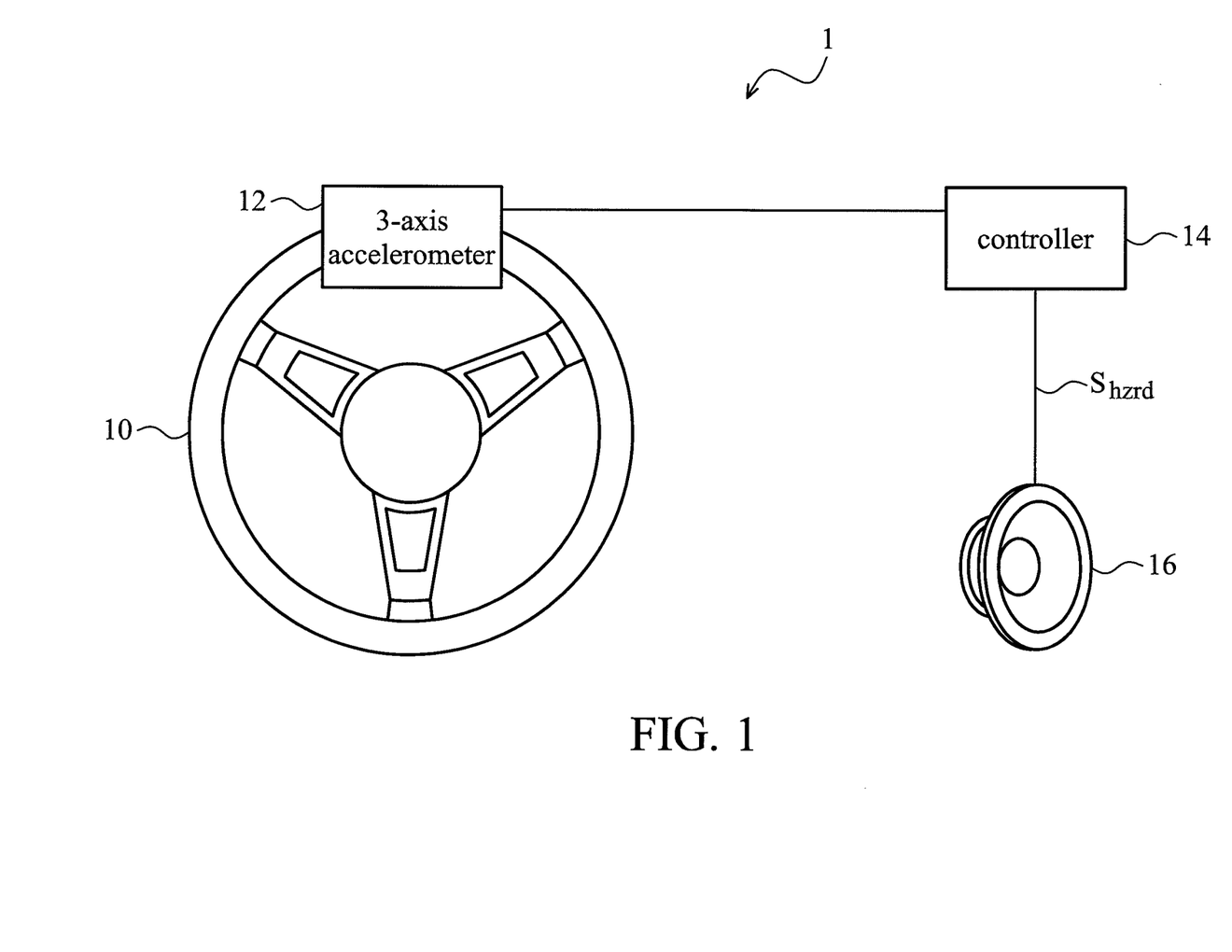
FIG. 1 is a system diagram of a driving alert system 1 according to an embodiment of the invention.

FIG. 1 is a system diagram of a driving alert system 1 according to an embodiment of the invention, adopted by various vehicles such as a car, a bus or an airplane. The driving alert system 1 includes a steering wheel 10, a 3-axis accelerometer 12, a controller 14 and a speaker 16. The controller 14 is coupled to the 3-axis accelerometer 12 and the speaker 16.

The 3-axis accelerometer 12 is attached on the steering wheel 10 to detect the turning operation of the steering wheel 10, and passes the detected turn information from the steering wheel to the controller 14. In turn, the controller 14 can determine whether a hazardous driving condition is present based on the turn information received from the steering wheel. When the hazardous driving condition is identified, the controller 14 may generate an alert signal $S_{hzrd}$ to the speaker 16, controlling the speaker 16 to generate an alert sound (alert message). The 3-axis accelerometer 12 can detect the speed along the x-axis, y-axis and z-axis, which are perpendicular to one another, to acquire precise turn information from the steering wheel. The 3-axis accelerometer 12 and/or the controller 14 may be realized by a set top box with a clip, which may be used by the driver, who may affix the set top box on the steering wheel, providing a direct and convenient approach for installation.

The controller 14 can determine the hazardous driving condition of the vehicle based on a turn direction and a turn angle indicated by the turn information from the steering wheel. More specifically, the controller 14 can determine the hazardous driving condition of the vehicle based on the vehicle speed and the turn information from the steering wheel. When the turn information indicates that the vehicle has alternately turned the steering wheel left and right exceeding a hazardous turn angle (alert angle), the controller 14 can determine that the vehicle is driven in a zigzag pattern, and therefore is in a hazardous driving condition. The hazardous turn angle is inversely proportional to the vehicle speed. For example, when the vehicle speed indicates that the vehicle is driven at a high speed, the 3-axis accelerometer detects that the steering wheel 10 has alternately been turned left and right exceeding 5 degrees within a short period, and the driver has failed to signal his turns, the controller 14 can determine that the vehicle is in a hazardous driving condition. When the vehicle speed indicates that the vehicle is being driven at a low speed, the 3-axis accelerometer detects the steering wheel 10 has been alternately turned left and right exceeding 30 degrees within a short period, and the driver has failed to signal his turns, then the controller 14 can determine that the vehicle is in a hazardous driving condition. In certain embodiments, when the controller 14 receives the signal detected by the 3-axis accelerometer 12 and indicating the alternate left and right turns exceeding 30 degrees, and fails to receive turn signals corresponding to the alternate left and right turns (first and second turns), the controller 14 can generate the alert signal $S_{hzrd}$ to alert for the alternate left and right turns. In certain embodiments, the driver can adjust the intermediate period for the controller 14 to determine the left and right turns of the steering wheel by a man-machine interface (not shown) equipped on the vehicle, such as a touch panel or an adjustment button. For example, the adjustable intermediate period may be adjusted in the range of 0.5 to 2 seconds, or other periods predefined by the user.

When a hazardous driving condition is identified, the speaker 16 can receive the alert signal $S_{hzrd}$ from the controller 14, and generate the alert sound to alert the driver or the passengers of the hazardous driving condition. Those skilled in the art would recognize that the speaker 16 may be replaced by other alert devices such as an alert light, an indication screen, a vibration device, or other alert devices installed in the vehicle.

Furthermore, although the embodiment in FIG. 1 utilizes the 3-axis accelerometer 12 as the device detecting the turn operation of the steering wheel, people skilled in the art would recognize that other turn detection devices may be employed in place of the 3-axis accelerometer 12, such as a 2-axis accelerometer, a gyroscope, or a machine-type turn detector. In the example of the gyroscope, a gyroscope is attached to the steering wheel 10 to detect the angular speed produced by the turning motion of the steering wheel 10, and deliver the detected angular speed information to the controller 14. In the example of the machine-type turn detector, a machine-type turn detector can be attached to the steering wheel 10 to mechanically detect the turning motion of the steering wheel 10.

Figure 5:
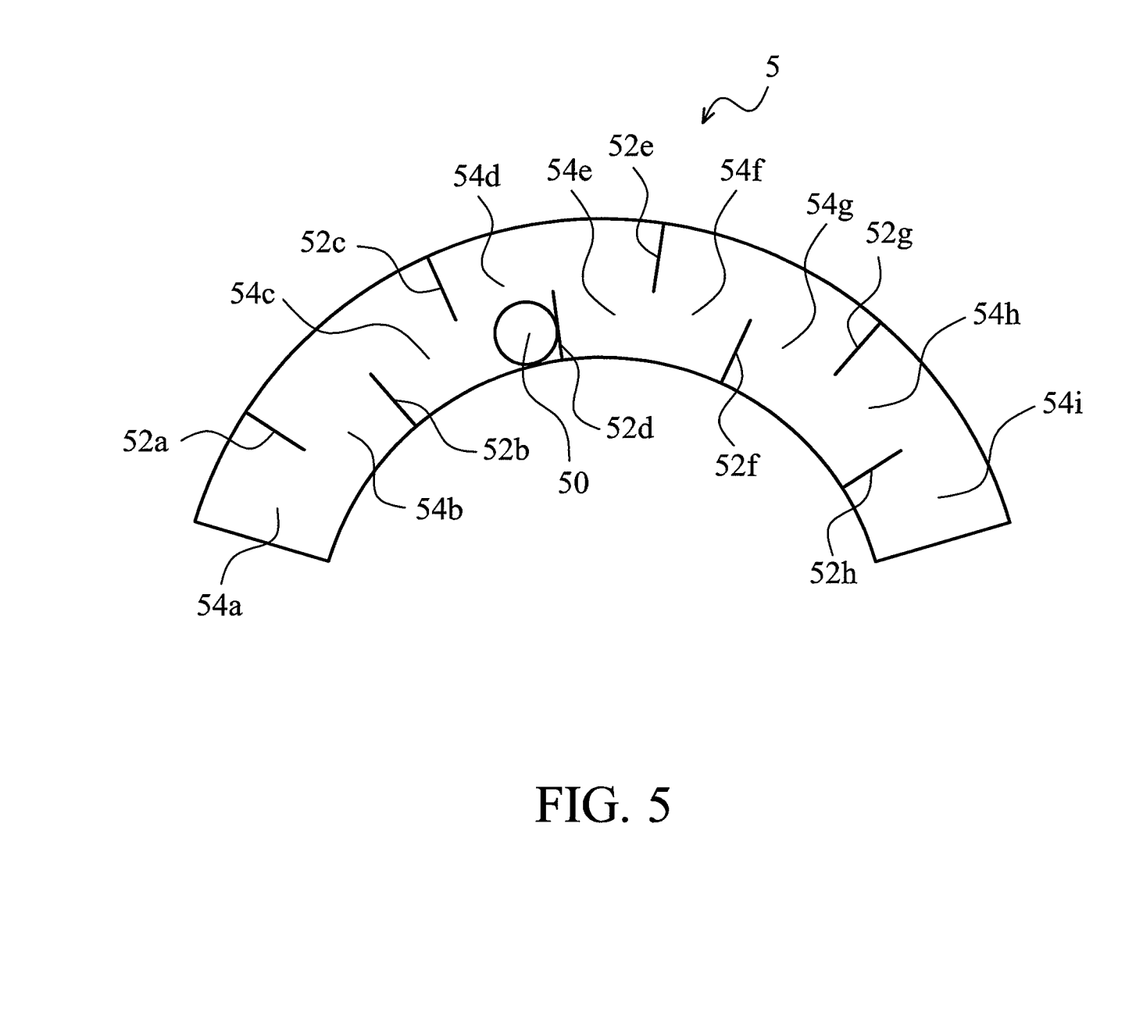
FIG. 5 illustrates a mechanical turn detector 5 according to an embodiment of the invention.

FIG. 5 illustrates a mechanical turn detector 5 according to an embodiment of the invention. The mechanical turn detector 5 includes a ball 50 and division leaves 52a-h which form a plurality of division spaces 54a-i. When the steering wheel 10 turns, the ball 50 will eventually stop in a division space 54n based on the turn direction and the turn angle, where n is one of a to i. In other words, each of the division spaces 54a through 54i represents a specific turn direction and a turn angle. The mechanical turn detector 5 can transmit the division space 54n where the ball 50 stays in the form of an electronic signal to the controller 14, so that the controller 14 can acquire the turn information from the steering wheel 10.

In the embodiment, the driving alert system 1 detects the turn information from the steering wheel by a turn detector installed on the steering wheel, determines whether the vehicle is driven in a zigzag pattern or is otherwise in a hazardous driving condition based on the detected turn information, and generates an alert to the driver and passengers when the hazardous driving condition is detected, thereby preventing further hazardous driving and reducing the occurrence of traffic accidents.

Figure 2:
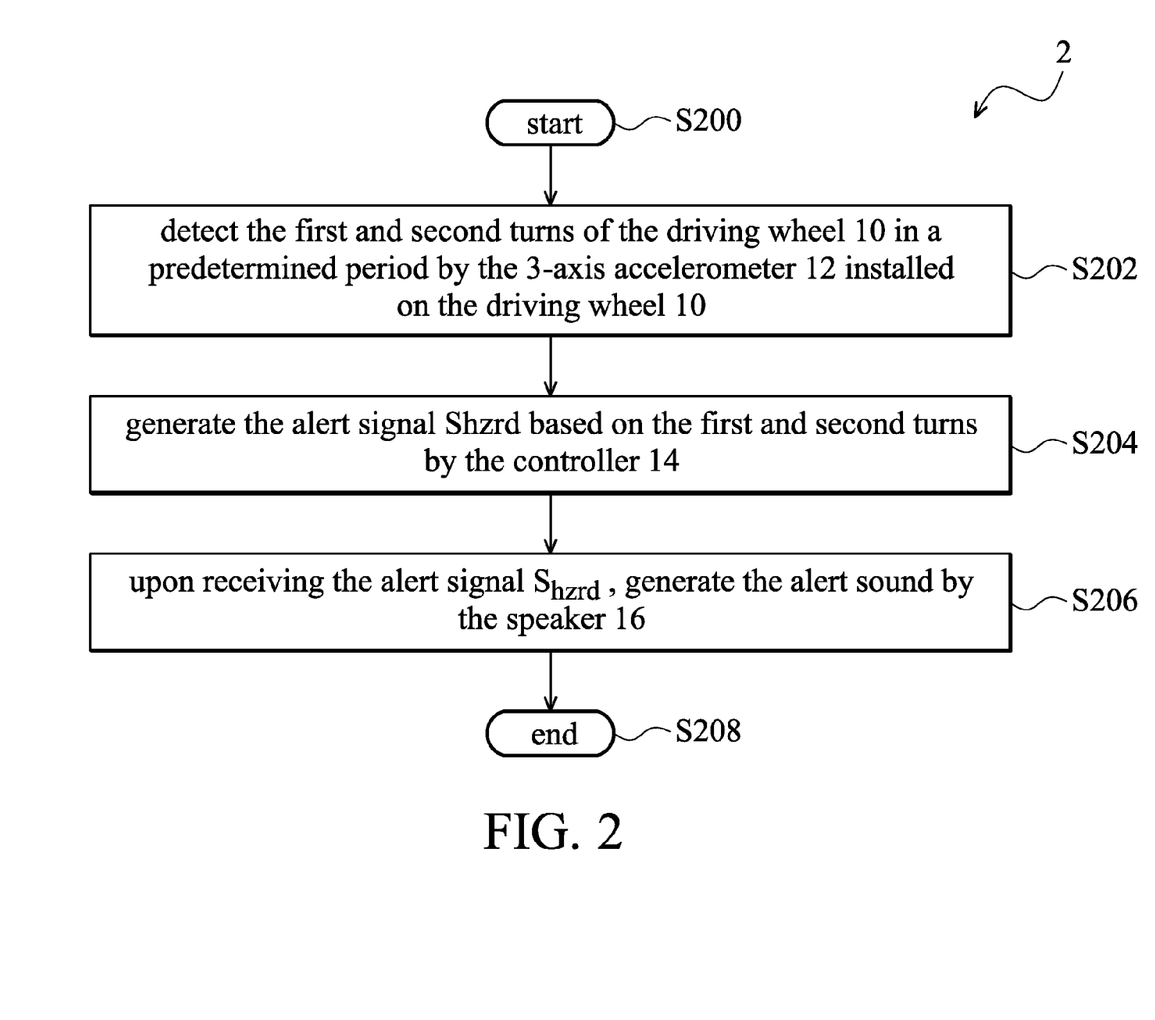
FIG. 2 is a flowchart of a driving alert method 2 according to an embodiment of the invention.

FIG. 2 is a flowchart of a driving alert method 2 according to an embodiment of the invention, adopted by the driving alert system 1 in FIG. 1.

Upon startup of the driving alert method 2, all components and devices in the driving alert system 1 are initialized and ready to detect the hazardous and zigzag driving condition of the vehicle (S200). The 3-axis accelerometer 12 detects the first turn and then the opposite second turn of the steering wheel within a short time, and transmits the detected turn information from the steering wheel to the controller 14 (S202).

Correspondingly, the controller 14 can produce the alert signal $S_{hzrd}$ based on the turn information from the steering wheel which includes the first turn and second turn, and transmit the alert signal $S_{hzrd}$ to the speaker 16 (S204). Specifically, when the turn information from the steering wheel indicates that the vehicle has alternately turned left and right exceeding the hazardous turn angle within a short time (the predetermined period), the controller 14 can determine that the vehicle is driven in a zigzag pattern, rendering a hazardous driving condition. In one embodiment, the hazardous turn angle and vehicle speed may exhibit an inversely proportional relationship. For example, when the vehicle speed indicates that the vehicle is moving at a high speed, the 3-axis accelerometer 12 detects that the steering wheel 10 turns alternately to the left and right exceeding 5 degrees within a short time, and the driver has failed to indicate, the controller 14 can determine that the vehicle is in a hazardous driving condition. When the vehicle speed indicates that the vehicle is moving at a low speed, the 3-axis accelerometer 12 detects that the steering wheel 10 alternately turns to the left and right exceeding 30 degrees within a short time, and the driver fails to signal, the controller 14 then can determine that the vehicle is in a hazardous driving condition. In certain embodiments, the driver can adjust the controller 14 to configure the intermediate period which is used for identifying the left and right alternate turns via the man-machine interface (not shown) equipped in the vehicle, such as a touch panel or adjustment button. For example, the driver can adjust the intermediate period via an in-car touch panel in the range between 0.5 to 2 seconds, or another adjustable range.

Upon receiving the alert signal $S_{hzrd}$, the speaker 16 can generate an alert sound, to remind of the driver that the vehicle alert system 1 has determined that there is a hazardous driving condition (S206). The driver should take appropriate action, such as taking a rest at the side of the road, or by replacing the driver, thus preventing a traffic accident from occurring.

The driving alert method 2 is then completed and exited (S208), returning to Step S202 for detecting subsequent zigzagging and hazardous driving by the vehicle.

The driving alert system 1 in the embodiment detects the turn information from the steering wheel by a turn detector which may be installed on the steering wheel, determines whether the vehicle is driven in a zigzag pattern or is otherwise in a hazardous driving condition based on the detected turn information, and generates an alert sound to the driver and passengers when the hazardous driving condition is detected, thereby preventing further hazardous driving and reducing the occurrence of traffic accidents.

Figure 3:
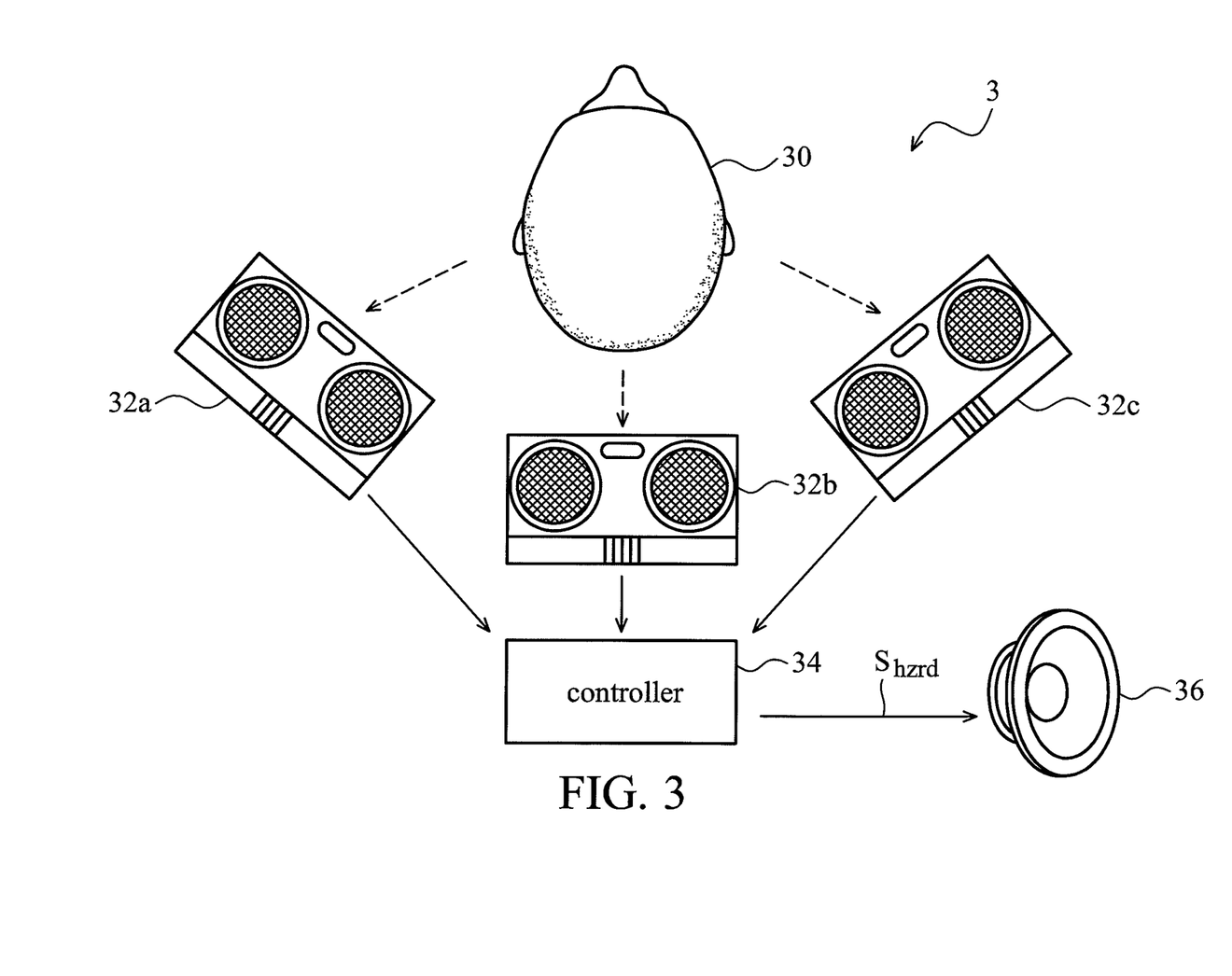
FIG. 3 is a system diagram of a driving alert system 3 according to an embodiment of the invention.

FIG. 3 is a system diagram of a driving alert system 3 according to an embodiment of the invention, adopted by, for example, various vehicles such as a car, a bus or an airplane. The driving alert system 3 includes a plurality of ultrasonic transceivers 32a-c, a controller 34 and a speaker 36. The controller 34 is coupled to the plurality of ultrasonic transceivers 32 a-c and the speaker 36.

The ultrasonic transceivers 32 a-c are configured to detect head-swing information pertaining to the movement of the driver's (user's) head 30 and pass the head-swing information to the controller 34. The head-swing information may contain head swing occurrences, swing counts, swing periods, and swing ranges. The controller 34 can determine whether a hazardous driving condition is present based on at least one of the components of the head-swing information. When a hazardous driving condition is determined, the controller 34 can generate an alert signal $S_{hzrd}$ to the speaker 36, controlling the speaker 36 to produce an alert sound (alert message).

The ultrasonic transceivers 32 a-c may be installed in the front or back of the driver's seat. For example, the ultrasonic transceivers 32 a-c may be installed on the steering wheel, on the windshield, on the front ceiling, on the back ceiling, on the back seats, or anywhere in the vehicle which allows the ultrasonic transceiver to detect the head motion of the driver (head swing). At least two of the ultrasonic transceivers 32 *a-c* are placed on the left and right sides of the driver's head 30. A third ultrasonic transceiver 32 *a-c* may be placed directly in front or back of the driver's head 30. In certain embodiments, the ultrasonic transceivers 32 *a-c* perform data transmission and reception in turn, i.e., only one of the ultrasonic transceivers 32 *a-c* is operating at any time. The ultrasonic transceivers 32 *a-c* transmit and receive the ultrasonic signals in turn, thereby being prevented from signals interrupting one another, and providing an increased precision in head positioning. In other embodiments, the ultrasonic transceivers 32 *a-c* perform data transmission and reception concurrently. Upon detecting the head swing of the driver, the ultrasonic transceivers 32 *a-c* can transmit the head-swing information to the controller 34. For instance, when the driver is tired from a long drive and dozes off, the ultrasonic transceivers 32 *a-c* will detect that the driver's head 30 moves down and back up, and subsequently sends the occurrence of the driver's heading moving up and down as the head-swing information to the controller 34. In other embodiments, when the driver is tired from driving and starts swinging his head left and right, the ultrasonic transceivers 32 *a-c* will detect that the driver's head 30 has moved beyond a safety range, and subsequently sends the occurrence of the driver's head moving beyond the safety range as the head-swing information to the controller 34.

The controller 34 can determine that the vehicle is in a hazardous driving condition based on the head-swing information pertaining to the movement of the driver's head 30. In some embodiments, the controller 34 can determine whether the hazardous driving condition is present based on the swing count and the swing period. For example, when the head-swing information indicates that the driver's head moves up and down more than twice within 1 second, the controller 34 can determine that a hazardous driving condition is present. In other embodiments, the controller 34 can determine whether a hazardous driving condition is present based on the swing range. For example, when the head-swing information indicates that the driver's head moves beyond the safety range, the controller 34 can determine the hazardous driving condition is present. When a hazardous driving condition is determined as being present, the controller 34 can generate the alert signal $S_{hzrd}$ to the speaker 36.

When a hazardous driving condition is determined, the speaker 36 can receive the alert signal $S_{hzrd}$ from the controller 34, and produce the alert sound to alert the driver and passengers of the hazardous driving condition. Those skilled in the art would recognize that the speaker 36 may be replaced by other alert devices such as an alert light, an indication screen, a vibration device of other alert devices installed in the vehicle.

Although the embodiment in FIG. 3 utilizes three ultrasonic transceivers for detecting the head position of the driver, people skilled in the art would recognize that two or more ultrasonic transceivers may be used to implement the invention. The two or more ultrasonic transceivers may be placed on the left and right sides of the driver's head 30 to detect the motion of the driver's head 30.

In certain embodiments, the driving alert system 3 may be incorporated with the driving alert system 1 to detect various hazardous driving conditions and issue a hazardous driving alert to the driver, thus increasing driver safety. Further, the sequence for executing the driving alert system 1 and the driving alert system 3 may be determined based on the applications.

The driving alert system 3 can detect the head motion of the driver by two or more ultrasonic transceivers, determine a hazardous driving condition based on the detected head motion of the driver, issue the hazardous driving alert and reduce the occurrence of traffic accidents.

Figure 4:
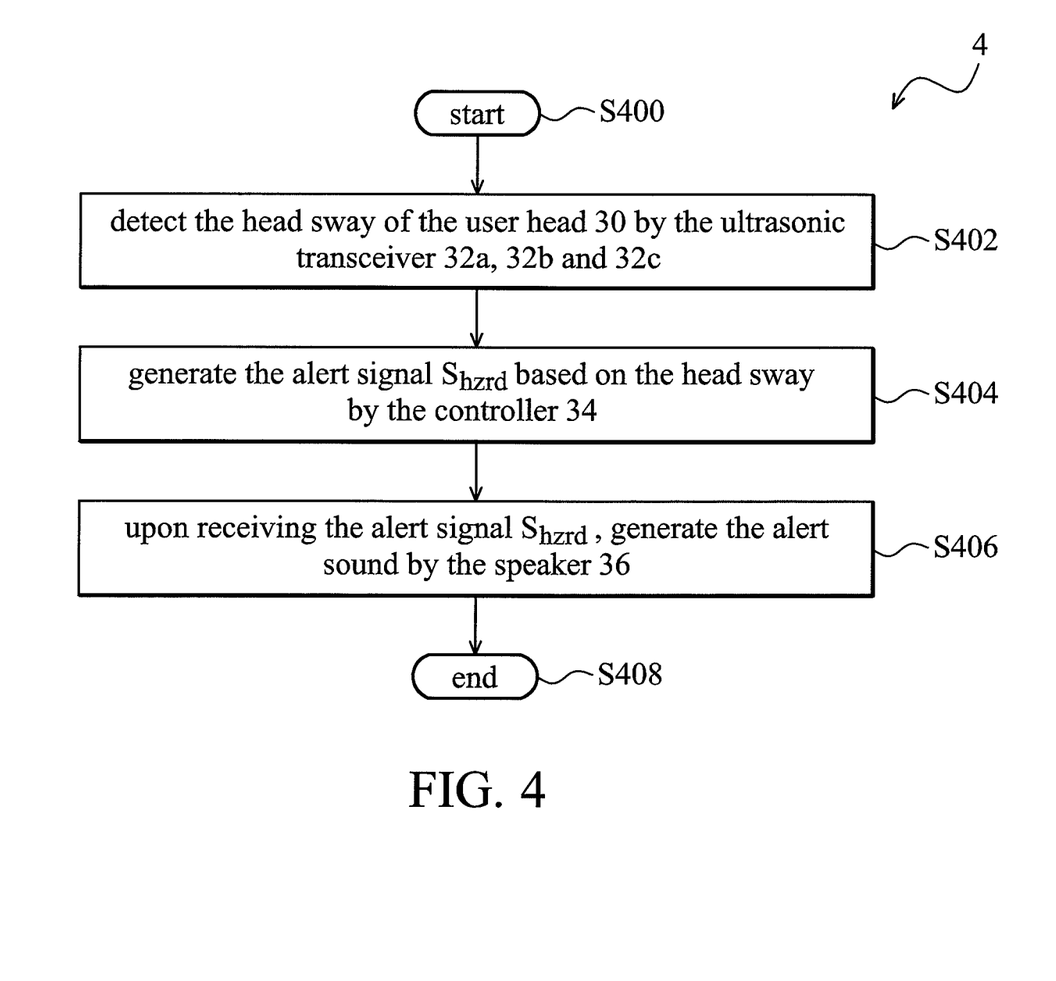
FIG. 4 is a flowchart of a driving alert method 4 according to an embodiment of the invention.

FIG. 4 is a flowchart of a driving alert method 4 according to an embodiment of the invention, adopted by the driving alert system 3 in FIG. 3.

Upon startup of the driving alert method 4, all components and devices in the driving alert system 3 are initialized, ready to detect any hazardous and zigzagging driving conditions of the vehicle (S400). When the ultrasonic transceivers 32*a-c* installed on left and right sides of the driver detect the driver's (user's) head swing, they can send the detected head swing information to the controller 34 (S402).

In response, the controller 34 can generate the alert signal $S_{hzrd}$ based on the head-swing information, and send the alert signal $S_{hzrd}$ to the speaker 36 (S404). The head-swing information may contain the head swing occurrence, the head swing count, the swing period and the swing range. The controller 34 can determine whether a hazardous driving condition is present based on whether one of the components of the head-swing information exceeds a predetermined threshold. In some embodiments, the controller 34 can determine the presence of a hazardous driving condition based on the head swing count and the swing period. For example, when the head-swing information indicates that the driver's head moves up and down more than twice within 1 second, the controller 34 can determine that a hazardous driving condition is present. In other embodiments, the controller 34 can determine whether a hazardous driving condition is present based on the swing range. For example, when the head-swing information indicates that the driver's head moves beyond the safety range, the controller 34 can determine that a hazardous driving condition is present. When a hazardous driving condition is determined as being present, the controller 34 can generate the alert signal $S_{hzrd}$ to the speaker 36.

Upon receiving the alert signal $S_{hzrd}$, the speaker 36 can generate the alert sound to remind the driver that the driving alert system 3 has detected a hazardous driving condition (S406). The driver should take appropriate action to deal with the hazardous driving condition, such as pulling off the road for a rest or changing the driver, to prevent accidents.

The driving alert method 4 is then completed and exited (S408), returning to Step S402 for detecting other hazardous driving conditions of the vehicle.

The driving alert method 4 in the embodiment can detect the head motion of the driver by two or more ultrasonic transceivers, can determine whether there is a hazardous driving condition based on the detected head motion of the driver, thereby generating the hazardous driving alert, reducing the risk of car accidents.

In some embodiments, the driving alert method 4 may be incorporated with the driving alert method 2 to detect various hazardous driving conditions and issue a hazardous driving alert to the driver, increasing driver safety. Although the alert method and system described in some of embodiments are relevant to driving alert method or system, it should be understood that the present invention is not limited the application field thereof, for example, the alert method and system described in FIGS. 3-4 can be used to prevent audience or student falling asleep in a lectures or speech.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An alert method, comprising:
   detecting, by a turn detector installed on a steering wheel, a first turn and a second turn of the steering wheel in a predetermined period;
   generating, by a controller, a first alert signal based on the first and second turns; and
   when receiving the first alert signal, generating, by an alert device, a first alert message,
   wherein the step of generating the first alert signal comprises:
      generating, by the controller, the first alert signal when the first and second turns are in opposite directions, and the turn angles of the first and second turns both exceed an alert angle,
   wherein the alert angle is inversely proportional to vehicle speed.

2. The alert method of claim 1, wherein the step of generating the first alert signal further comprises:
   generating, by the controller, the first alert signal based on the first and second turns, only when failing to receive a turn signal corresponding to the first or second turn.

3. The alert method of claim 1, further comprising receiving, by the controller, an adjustment signal to adjust the predetermined period.

4. The alert method of claim 1, further comprising:
   detecting, by a plurality of ultrasonic transceivers, head-swing information pertaining to the movement of a user's head;
   generating, by the controller, a second alert signal based on the head-swing information; and
   when receiving the second alert signal, generating, by the alert device, a second alert message.

5. The alert method of claim 4, wherein the head-swing information comprises a swing occurrence, a swing range, a swing count and a swing period of the user's head.

6. The alert method of claim 5, wherein the step of generating the second alert signal comprises:
   generating, by the controller, the second alert signal when one of the head-swing information exceeds a predetermined threshold.

7. An alert system, comprising:
   a steering wheel;
   a turn detector, installed on the steering wheel, configured to detect a first turn and a second turn of the steering wheel in a predetermined period;
   a controller, coupled to the turn detector, configured to generate a first alert signal based on the first and second turns; and
   an alert device, coupled to the controller, when receiving the first alert signal, configured to generate a first alert message,
   wherein the controller is configured to generate the first alert signal when the first and second turns are in opposite directions, and the turn angles of the first and second turns both exceed an alert angle,
   wherein the alert angle is inversely proportional to vehicle speed.

8. The alert system of claim 7, wherein the controller is further configured to generate the first alert signal only when failing to receive a turn signal corresponding to the first or second turn.

9. The alert system of claim 7, wherein the controller is further configured to receive an adjustment signal to adjust the predetermined period.

10. An alert system, comprising:
    a plurality of ultrasonic transceivers, configured to detect head-swing information pertaining to the movement of a user's head;
    a controller, coupled to the plurality of ultrasonic transceivers, configured to generate a first alert signal based on the head-swing information;
    an alert device, coupled to the controller, configured to generate a first alert message when receiving the first alert signal;
    a steering wheel; and
    a turn detector, installed on the steering wheel, configured to detect a first turn and a second turn of the steering wheel in a predetermined period;
    wherein the controller is coupled to the turn detector and configured to generate a second alert signal based on the first and second turns; and
    when receiving the second alert signal, the alert device is configured to generate a second alert message,
    wherein the controller is configured to generate the second alert signal when the first and second turns are in opposite directions, and turn angles of the first and second turns both exceed an alert angle,
    wherein the alert angle to vehicle speed.

11. The alert system of claim 10, wherein the head-swing information comprises a swing occurrence, a swing range, a swing count and a swing period of the user's head.

12. The alert system of claim 11, wherein the controller is configured to generate the first alert signal when one of the head-swing information exceeds a predetermined threshold.

13. The alert system of claim 10, wherein the controller is further configured to receive an adjustment signal to adjust the predetermined period.

14. The alert system of claim 10, wherein two of the ultrasonic transceiver are placed on the rear left and right of the user's head.

* * * * *